Figures 1, 2:
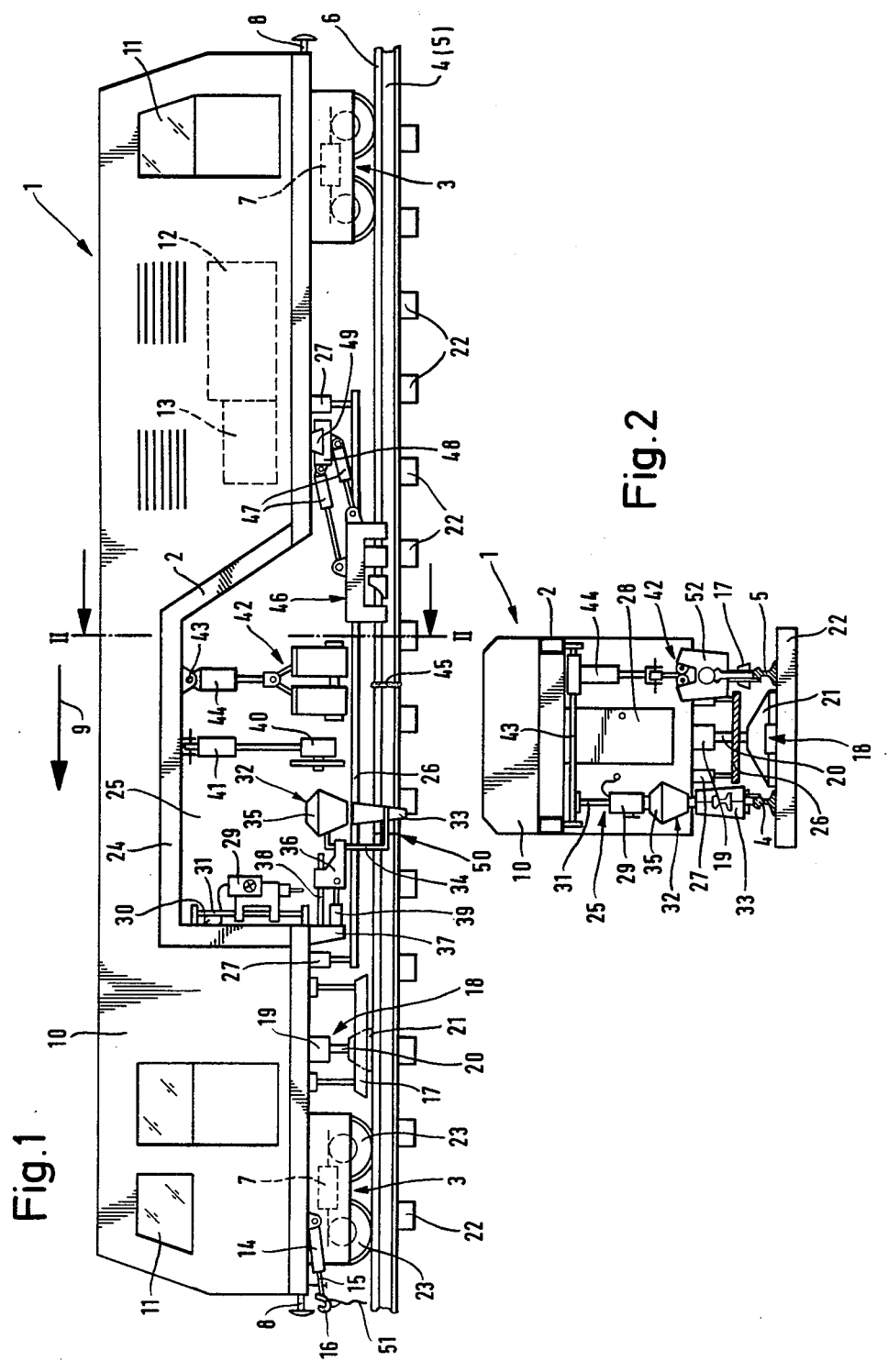

United States Patent [19]

Cöllen

[11] 4,236,453
[45] Dec. 2, 1980

[54] MOBILE RAIL WELDING MACHINE

[75] Inventor: Heinrich Cöllen, Grevenbroich, Fed. Rep. of Germany

[73] Assignee: Franz Plasser Bahnbaumaschinen-Industriegesellschaft m.b.H., Vienna, Australia

[21] Appl. No.: 960,096

[22] Filed: Nov. 13, 1978

[30] Foreign Application Priority Data

Dec. 28, 1977 [AT] Austria .................................. 9353/77

[51] Int. Cl.³ ....................... E01B 29/42; E01B 31/18
[52] U.S. Cl. ........................................ 104/15; 219/53; 219/97
[58] Field of Search ................. 104/1 R, 15; 238/162, 238/163, 164; 219/53, 54, 55, 97, 100; 228/45; 29/33 A, 33 B, 565; 51/178

[56] References Cited

U.S. PATENT DOCUMENTS

| 2,250,869 | 7/1941 | Jones et al. | 104/15 X |
| 3,355,991 | 12/1967 | Cox | 409/293 |
| 3,366,075 | 1/1968 | Clayborne et al. | 104/15 |
| 3,635,165 | 1/1972 | Platov et al. | 104/15 |
| 3,726,232 | 4/1973 | Bryan, Jr. | 104/15 |
| 3,731,635 | 5/1973 | Hambrick | 104/15 X |
| 4,050,196 | 9/1977 | Theurer | 51/178 |

FOREIGN PATENT DOCUMENTS

| 1271740 | 7/1968 | Fed. Rep. of Germany | 104/15 |
| 347148 | 3/1937 | Italy | 104/1 R |
| 1235164 | 6/1971 | United Kingdom | 104/15 |

Primary Examiner—Randolph A. Reese
Attorney, Agent, or Firm—Kurt Kelman

[57] ABSTRACT

A mobile rail welding machine comprises a frame, a hydraulically driven flash butt welding device, a "Thermit" welding unit and preferably an electric arc welding device mounted on the frame for selectively flash butt welding, "Thermit" welding or arc welding abutting rail section ends of a track rail, and a weld burr removal device adjustably mounted on the frame for selectively removing weld burrs at either rail.

10 Claims, 2 Drawing Figures

U.S. Patent     Dec. 2, 1980     4,236,453

MOBILE RAIL WELDING MACHINE

The present invention relates to improvements in a mobile rail welding machine mounted on a track for mobility in an operating direction, the track being comprised of rails consisting of rail sections having abutting ends and ties supporting the rail sections.

Known rail welding machines for welding the abutting rail sections ends of a selected one of the rails comprise a frame, a hydraulically driven flash butt welding device and a weld burr removal device adjustably mounted on the frame for selectively removing weld burrs at either one of the rails immediately after welding. These weld burrs, also called weld flashes, are formed during the flash butt welding operation and they are removed by the device by cutting, milling or grinding, and the like. Self-propelled rail welding machines have been developed which carry a flash butt welding device mounted on a boom projecting from the front end of the machine and adjustable to enable the welding device to operate on the right or left rail. The machine carries all power sources and controls necessary for the welding and weld flash removal operations, and has proved to be highly efficient, easy to operate and capable of producing high-quality welded rail joints. Since the chassis of the machine is built along the lines of a regular railroad car and has couplings at the respective ends thereof, it can be transported as part of a train or rapidly move on its own power. At the welding site, it can be quickly put into operation and thus is particularly effective to shorten the required down-time of the track during which trains cannot pass.

German Auslegeschrift No. 1,271,740, published July 4, 1968, discloses a "Thermit" rail welding machine comprising a carriage mounted on small rollers for running on the tracks rails to facilitate the transport of the machine from working site to working site. The machine does not have its own drive nor does it provide coupling means enabling the carriage to be connected to railroad cars so that it requires a special transport vehicle for bringing the machine to the operating station and to remove it therefrom. The carriage has a "Thermit" welding unit and a hydraulically driven weld burr removal device mounted thereon for removing weld burrs.

As used throughout the specification and claims, "Thermit" welding refers to the well known welding process using a mixture of aluminum powder and powdered iron oxide that, when caused to react by strong heating, evolves a greater deal of heat and yields alumina and a white-hot molten mass of metallic iron used in welding. In the apparatus disclosed in the German publication mentioned hereinabove, this welding mixture must be carried along on a separate auxiliary car. Particularly, since "Thermit" welding is much slower than flash butt welding, this machinery produces rather slow progress, particularly when extended lengths of track rails are to be welded at numerous joints.

Practical considerations often require different welding processes to be used at rail joints along an extended track section, including butt welding as well as various other types of welds. In such instances, it has been the practice to use one type of welding unit adapted to effectuate the selected process in a first operating stage and to produce the other type or types of welds in a successive stage or successive stages. This involves several down-times for the affected track section and a great number of operators to man each working pass. Furthermore, the required apparatus for different types of welding processes is rarely available at the working site and must be brought there from long distances. Since such considerations are of considerable importance in choosing the welding process to be used, important economic and technical reasons for selecting a specific welding method are pushed into the background.

U.S. Pat. No. 3,726,232, dated Apr. 10, 1973, discloses a mobile rail welding machine wherein a boom assembly supporting oxyacetylene welding torches and rail gripping mechanisms is mounted on a rail-bound vehicle.

U.S. Pat. No. 3,355,991, dated Dec. 5, 1967, deals with a machine for conditioning welded rail joints, wherein a support frame is wheeled along a track and supports a weld flash removal machine.

It is the primary object of this invention to provide a mobile rail welding machine of the first-described type and which is adapted to perform the most important and frequently encountered welding processes on track rails with optimal economic and technical efficiency, preferably in a single pass.

The above and other objects are accomplished in accordance with the invention with a mobile rail welding machine which comprises the combination of a frame, a hyraulically driven flash butt welding device for welding the abutting rail section ends of a selected one of the rails mounted on the frame, a "Thermit" welding unit for welding the abutting rail section ends of a selected one of the rail mounted on the frame whereby the abutting rail section ends may by selectively flash butt welded or "Thermit" welded, and a weld burr removal device adjustably mounted on the frame for selectively removing weld burrs at either one of the rails.

This combination for the first time provides a universally adaptable mobile rail welding machine which, without increasing the power and personnel requirements of a single-purpose machine makes it possible to use the special welding technique best suited for the specific purpose. Its structure is simple and rational, making easy operation without danger to the operating personnel possible. Since the different welding processes are effected in continuous succession in a single pass and the machine is self-propelled to move from welding site to welding site, the work proceeds rapidly and the downtime of the track is reduced to a minimum.

In their planning of track maintenance machinery, railroad administrations need to acquire and use only a single machine for all types of welding techniques and, in addition, since the machine is self-propelled, it is capable of carrying along all the materials required in "Thermit" welding, either on its own chassis or in a car coupled to the self-propelled machine, thus alleviating the transport problems encountered in the above-described "Thermit" rail welding machine.

While the machine is adapted for different welding processes, its structure is quite simple. Thus, the same weld burr removal device may be used for removing the weld flashes produced by butt welding and the weld beads resulting from the excess welding material in "Thermit" welding, this device being adjustable for use with either rail. It would be possible to use a similarly adjustable "Thermit" welding unit for selective use at either rail by transversely moving the unit or two such units may be provided, each unit being associated with a respective rail.

If an electric arc welding device is additionally mounted on the frame, the usage of the machine will be further enhanced, enabling the machine to be used also for work requiring arc welding operations, including welding rail contacts to the rails and the like, such welding operations being advantageously effected, if desired, during the preparation of other welding operations and during such welding operations. This will save additional time. Since more than one welding device will be in operation simultaneously only in such special cases, the power plant for the entire machine need not be essentially larger than one used only for butt welding. Suitable safety switches may be installed to be tripped in case of overloads on the power plant when more than one welding unit is used at a time.

The above and other objects, advantages and features of the present invention will become more apparent from the following detailed description of a now preferred embodiment thereof, taken in conjunction with the accompanying somewhat schematic drawing wherein FIG. 1 is a side elevational view of a mobile rail welding machine according to this invention and FIG. 2 is a cross sectional view of the machine according to line II—II of FIG. 1.

Referring now to the drawing, there is shown a mobile welding machine 1 comprising frame 2 and two undercarriages 3, 3 spaced from each other along track 6 and supporting the frame thereon. The track is comprised of rails 4 and 5 consisting of rail sections having abutting ends (see rail joints 45) and ties 22 supporting the rail sections. The rail welding machine is mounted on track 6 for mobility in an operating direction indicated by arrow 9 and, in the illustrated embodiment, front and rear undercarriages 3 are double-axle trucks each including drive 7 for driving wheels 23, thus making machine 1 self-propelled.

The closed machine housing or chassis 10 is constructed more or less like that of a regular railroad car and is mounted on frame 2 which has couplings 8, 8 at both ends to enable the machine to be incorporated into a train, if desired, the machine chassis including operator's cabs 11 at its respective ends. The machine frame has a recessed portion 24 intermediate the undercarriages and somewhat closer to the front than to the rear end of machine 1, protected space 25 defined by intermediate frame portion 24 serving to house the operating devices of the welding machine. Power plant 13 and drive motor 12 of the machine, which is connected to drives 7, 7 are housed in the rear and longer portion of chassis 10, the power plant including at least one electrical current generator for supplying power to any selected welding device as well as the required pressure fluid source or sources for hydraulically and possibly pneumatically operated devices used in the machine.

A self-propelled rail welding machine of a construction of this general type is disclosed in U.S. patent application Ser. No. 957,402, filed Nov. 3, 1978 by Josef Theurer and owned by a common assignee, whose disclosure is incorporated herein by way of reference.

As has also been disclosed and is claimed in the commonly owned copending application, a hydraulic jack 14 is mounted on machine frame 2 at each side of front undercarriage 3 and above each track rail for pivoting about a pivot extending transversely of the machine and the track. The free end of piston rod 15 of jack 14 carries a hook 16 for holding one end of a cable 51 whose other end may be affixed to the respective rail for a purpose and in a manner to be explained hereinafter. Furthermore, support means 18 for the machine frame is arranged in the region of the front end, the illustrated support means being constituted by a hydraulic jack means mounted adjacent and rearwardly of the front undercarriage and substantially centered between track rails 4 and 5, as shown in FIG. 2. This hydraulic means comprises centered hydraulic cylinder 19 projecting downwardly from frame 2 and shoe 21 attached to the free end of piston rod 20 extending from the hydraulic cylinder. When hydraulic fluid is supplied to cylinder 19 to lower shoe 21 into engagement with an underlying tie 22 to lift wheels 23 of the front undercarriage off the rails, the rails are relieved of the machine weight in the forward range of the machine where the welding operations take place. This, as has been pointed out in the copending application, is of particular importance in welding techniques wherein the rail sections to be welded are moved relative to each other to effectuate the weld, for example if flash butt welding. With the weight of the machine no longer pressing against the forward rail section, it may be readily moved in a longitudinal direction towards joint 45 after the rail fastening elements attaching the rail section to the ties have been loosened or dismantled.

A rail pre-heating means 17 is associated with each of the rails and is arranged on frame 2 at each side of support 18 between front undercarriage 3 and a foremost one of the welding devices to be described hereinafter.

Recessed frame portion 24 of machine frame 2 defines protected operating space 25 of the machine, which is accessible from the interior of chassis 10 through door 28. Vertically movable working platform or operating stage 26 forms the floor of the operating space and is vertically adjusted by hydraulic jacks 27 relative to the frame. This operating stage in the region of the operating tools of the machine make the operation and servicing of these tools very easy since all these tools are readily accessible from the interior of the chassis and the operating stage can be readily adjusted to positions attuned to the selected operation.

In accordance with the present invention, the various operating tools or devices for a variety of welding operations as well as for the removal of weld flashes or burrs are mounted on the machine frame in operating space 25. This includes electric arc welding device 29 rearwardly of which, with reference to the operating direction, is mounted "Thermit" welding unit 32 and rearwardly of which is mounted flash butt welding device 42. Finally, weld burr removal device 46 is adjustably mounted on machine frame 2 rearwardly of the flash butt welding device for selectively removing weld burrs at either one of the track rails.

With this preferred arrangement, the entire weight of the machine is substantially uniformly distributed over both undercarriages, which is important because of the allowable weight limitations particularly on side tracks and also makes the structure of the machine frame simple while both undercarriages may be of the same type. At the same time, all tools are readily accessible to, and controllable by, the operators who are protected against all weather conditions and from trains passing on a parallel track, thus assuring excellent working conditions. The specifically described and illustrated series arrangement of the operating devices takes into account the working requirements for most of the operations encountered in rail welding, thus further enhancing the efficiency of the machine. With the provision of the rail pre-heating means ahead of the welding devices, the machine is adapted to welding operations which require a narrow range of rail temperature, making it possible to use the machine even when the ambient temperature is too low for keeping the rails in the required temperature range. Thus, no special machines and crew are needed to precede the welding machine to bring the rails to the desired welding temperature, thus further improving the work speed and reducing personnel.

The specifically illustrated arc welding device 29 is mounted for vertical adjustment on guide post 31 affixed to front wall 30 of operating space 25. This device can be used for special welds, such as welding rail contacts to the rail and producing welds on the surface of the rail head. While only one electric arc welding device 29 has been shown in the drawing for the sake of clarity, it may be useful to mount a respective arc welding device associated with each rail or, alternatively, to mount one such device for transverse movement on the frame so that it may be associated with a selective track rail.

Rearwardly of the electric arc welding device or devices are mounted "Thermit" welding units 32 associated with each of the rails for welding abutting rail section ends of a selected rail. Such "Thermit" welding units are conventional and, in essence, are comprised of a two-part mold 33 adapted to encompass the rail, as shown in FIG. 2, a crucible 35 holding the welding mixture and a bracket 34 interconnecting the mold and crucible and forming a welding assembly. Bracket 34 is vertically adjustably mounted on slide 36 which, in turn, is horizontally adjustably mounted on guide bar 38 affixed to bracket 37 on machine frame 2. Hydraulic jack 39 is operable to move the slide and thus the welding assembly 33, 34, 35 horizontally while its vertical movement is effected adjusting bracket 34 in slide 36. Again, for the sake of clarity of illustration, FIG. 2 shows only a single unit 32 although one such unit is preferably associated with each rail.

Rail grinding machine 40 (shown for the sake of clarity only in FIG. 1) is mounted substantially centrally in operating space 25 and is suspended for free pendulum movement from machine frame 2 by hydraulic jack 41. In case the rail joint to be welded would fall in the range of a tie 22, where welding is not possible, one or the other of the abutting rail section ends can be ground down with machine 40 sufficiently to displace the rail joint into the range of the adjacent crib.

As in the machine described in the above-identified patent application, hydraulically driven flash butt welding device 42 for welding the abutting rail section ends of a selected rail is mounted rearwardly of grinding machine 40. The flash butt welding device comprises a pair of welding jaws 52 containing the required welding apparatus and is suspended for free pendulum movement from the free end of the piston rod of hydraulic jack 44 to enable the welding device to be raised and lowered. The jack is affixed to a guide sleeve journaled on transverse guide bar 43 for moving the welding device from one rail to the other. When operated, the flash butt welding device will produce weld flash or burr 45 at the abutting rail section ends, which must be removed to produce a smooth-surfaced rail.

Any excess welding material produced by "Thermit" welding at joint 50 and/or weld flash 45 produced by butt welding is removed by burr removal device 46 which is hydraulically driven by a pair of guides constituted by hydraulic jacks 47 extending in a longitudinal direction of the machine and linked to slide 48 which is guided for transverse reciprocation from one rail to the other on guide bar 49 of dove-tailed cross section. The adjustability of the weld burr removal device relative to the machine frame in a plane parallel to the plane of the track considerably simplifies and accelerates operations. Since this and all other operating tools are adjustable on the machine, they may be readily coordinated without correcting the position of the heavy welding machine frame itself, thus preserving the machine drive and brakes from excess use and further relieving the machine operator to enable him to concentrate on other control operations.

The operation of the welding machine will be obvious from the above description of the structure, in conjunction with the following explanation:

While support 18 and all the operating tools are raised, machine 1 is driven in the direction of arrow 9 to the working site and drives 7 are disengaged and the machine is stopped as soon as the abutting rail section ends to be welded together are at least approximately beneath welding unit 32 when this unit is to be used for the selected joint. If the rail temperature is below the required welding temperature range, heating means 17 is actuated to raise the temperature of the rail to the required range.

If "Thermit" welding unit 32 is used, two-part casting mold 33 is opened, the unit is lowered from its position shown in FIG. 2, jack 39 is operated to bring the casting mold into alignment with joint 50, i.e. it would have to be moved forwardly from the position shown in FIG. 1, the mold is closed about the rail, and the welding mixture is reacted in crucible 35 until the white-hot molten mass flows into the mold to form the weld about the abutting rail section ends at joint 50. After the weld has been formed, the mold is opened again, unit 32 is raised to its rest position and machine 1 is rapidly advanced in the direction of arrow 9 to bring the welded joint into the range of weld burr removal device 46. Hydraulic jacks 47 are then actuated to drive the cutting head of device 46 over the joint and thus to remove all excess welding material therefrom, thus conditioning the rail to provide a smooth surface in a single pass of device 46.

When flash butt welding device 42 is to be used, the machine is stopped before the front undercarriage has reached the joint to be welded and the operation proceeds in a manner described in the above-identified application. Wire rope 51 is attached to hook 16 of jack 14 associated with a respective rail comprising the two rail sections whose abutting ends are to be welded together, and the other end of the wire rope is suitably clamped to a forward portion of the rail section ahead of the front undercarriage. The rail fastening elements are previously loosened or removed so that this rail section rests freely on ties 22 and jack 14 is actuated to pull the rail section to within about 5 to 11 mm of the abutting end of the adjoining rail section on which machine 1 stands. The machine is then driven in operating direction 9 until the rail joint comes to lie within the range below flash butt welding device 42. Jack 19 is now actuated to lower support shoe 21 and lift machine 1 sufficiently to disengage wheels 23 of the front undercarriage from the rails. Jack 44 is then actuated to lower device 42 until the rail joint is disposed between the pair of welding jaws 52. After welding is completed, the welding jaws are opened and the welding device is immediately raised, the removal of weld flash 45 then proceeding in the same manner as has been described hereinabove with respect to joint 50.

What is claimed is:

1. A mobile rail welding machine mounted on a track for mobility in an operating direction, the track being comprised of rails consisting of rail sections having abutting ends and ties supporting the rail sections, which comprises the combination of
   (a) a heavy frame supported on the track rails for movement in the operating direction,
   (b) a hydraulically driven flash butt welding device for welding the abutting rail section ends of a selected one of the rails mounted on the frame,
   (c) a "Thermit" welding unit for welding the abutting rail section ends of a selected one of the rails mounted on the frame whereby the abutting rail section ends may be selectively flash butt welded or "Thermit" welded, and
   (d) a weld burr removal device adjustably mounted on the frame for selectively removing weld burrs at either one of the rails.

2. The mobile rail welding machine of claim 1, further comprising an electric arc welding device mounted on the frame.

3. The mobile rail welding machine of claim 1 or 2, further comprising two undercarriages spaced from each other along the track and supporting the frame thereon, two of said "Thermit" welding units, each of the units being associated with a respective one of the rails, and the welding and weld burr removal devices being mounted on the frame intermediate the undercarriages.

4. The mobile rail welding machine of claim 3, wherein, with reference to the operating direction, the flash butt welding device is mounted rearwardly to the "Thermit" welding unit and the weld burr removal device is mounted rearwardly of the flash butt welding device.

5. The mobile rail welding machine of claim 3, further comprising a rail pre-heating means associated with each one of the rails and arranged on the frame between a front one of the undercarriages, with reference to the operating direction, and a foremost one of the welding devices.

6. The mobile rail welding machine of claim 2, wherein the "Thermit" welding unit is mounted rearwardly of the electric arc welding device.

7. The mobile rail welding machine of claim 1, further comprising hydraulically operated means for moving the "Thermit" welding unit and the weld burr removal device along the track relative to the frame.

8. The mobile rail welding machine of claim 1, further comprising a support means for the frame arranged at a respective end region of the frame and operable to relieve the track rails of the machine weight.

9. The mobile rail welding machine of claim 8, wherein the support means is a hydraulic jack means.

10. The mobile rail welding machine of claim 1, further comprising an operating platform mounted for adjustment relative to the frame in the region of the flash butt welding device and the "Thermit" welding unit.

* * * * *